(12) United States Patent       (10) Patent No.:     US 8,713,030 B2
Imoto et al.                    (45) Date of Patent:    Apr. 29, 2014

(54) VIDEO EDITING APPARATUS

(75) Inventors: Kazunori Imoto, Kanagawa (JP);
Makoto Hirohata, Tokyo (JP); Hisashi Aoki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 151 days.

(21) Appl. No.: 13/376,274

(22) PCT Filed: Jun. 5, 2009

(86) PCT No.: PCT/JP2009/002558
§ 371 (c)(1),
(2), (4) Date: Jan. 25, 2012

(87) PCT Pub. No.: WO2010/140195
PCT Pub. Date: Dec. 9, 2010

(65) Prior Publication Data
US 2012/0117087 A1    May 10, 2012

(51) Int. Cl.
G06F 17/30    (2006.01)
(52) U.S. Cl.
USPC .......................... 707/749; 707/780
(58) Field of Classification Search
USPC ............... 707/749, 780, 805; 382/118, 224; 700/94
See application file for complete search history.

(56) References Cited

U.S. PATENT DOCUMENTS 6,424,677 B1 * 7/2002 Moeller et al. ........... 375/240.26
6,507,839 B1 * 1/2003 Ponte ................................ 1/1
7,908,300 B2 * 3/2011 Stluka et al. .................. 707/805
2003/0234803 A1 12/2003 Toyama et al.
2006/0026155 A1 2/2006 Kobayashi
2006/0224616 A1 10/2006 Imoto et al.
2009/0067807 A1 3/2009 Hirohata et al.
2009/0132074 A1 * 5/2009 Yamada ......................... 700/94
2010/0150408 A1 * 6/2010 Ishikawa ...................... 382/118
2010/0172591 A1 * 7/2010 Ishikawa ...................... 382/224
2011/0225196 A1 * 9/2011 Haseyama .................... 707/780

FOREIGN PATENT DOCUMENTS

JP      2004 23798    1/2004
JP      2006 40085    2/2006
JP      2006 164008   6/2006
JP      2008 22103    1/2008

OTHER PUBLICATIONS

International Search Report Issued Jul. 21, 2009 in PCT/JP09/002558 Filed Jun. 5, 2009.

* cited by examiner

Primary Examiner — James Trujillo
Assistant Examiner — Thong Vu
(74) Attorney, Agent, or Firm — Oblon, Spivak, McClelland, Maier & Neustadt, L.L.P.

(57) ABSTRACT

A video editing apparatus 100 includes a registering unit 91 configured to register a key candidate having a feature vector of a sound signal which is determined to be registered on the basis of a co-occurrence score to a managing unit 51 as a search key, and a cutting out unit 71 configured to obtain an integration score in each of the blocks from the degree of similarity of the registered search key in each of the blocks and cut out a group of blocks exceeding an integration threshold value from among the integration scores as one video scene.

4 Claims, 16 Drawing Sheets

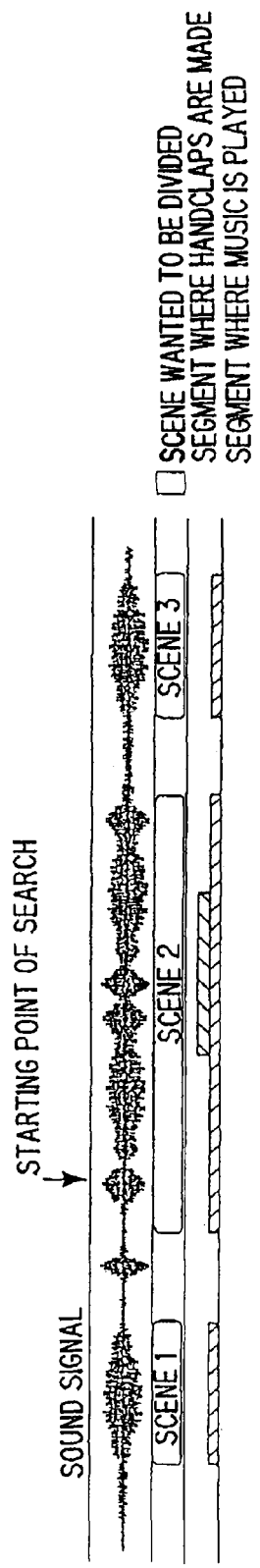

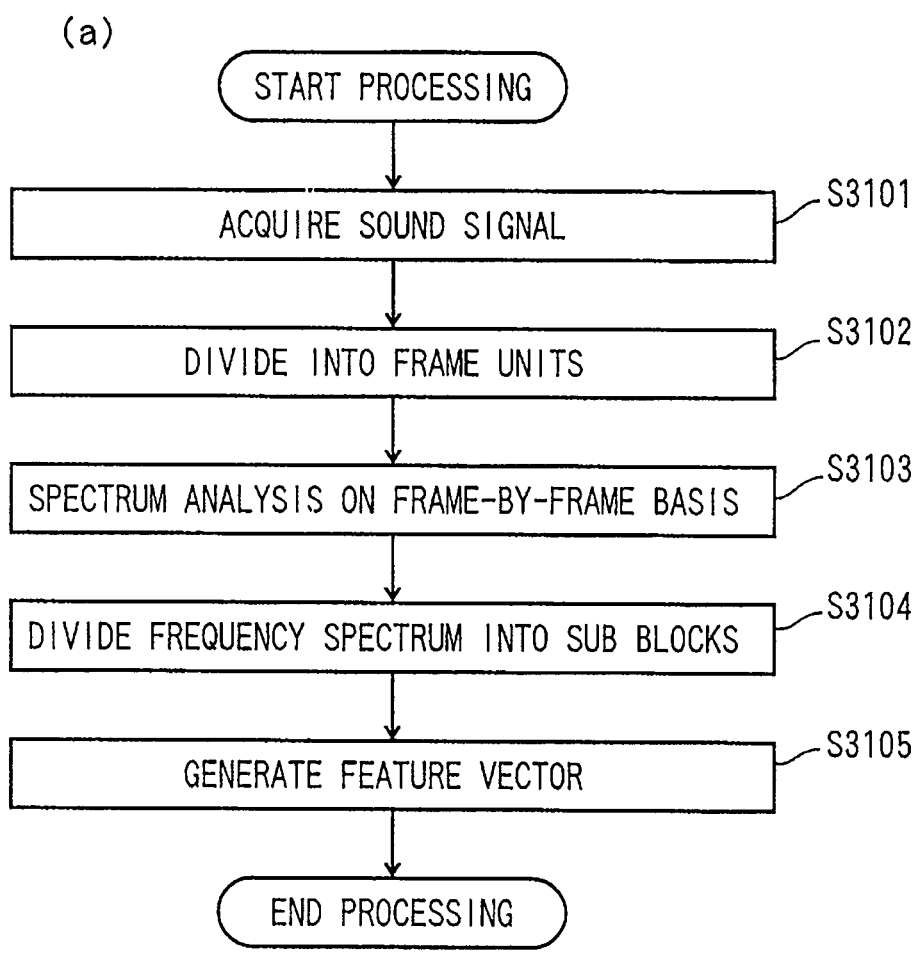

(b)

FREQUENCY AXIS

TIME AXIS

FIG.5B
(b)
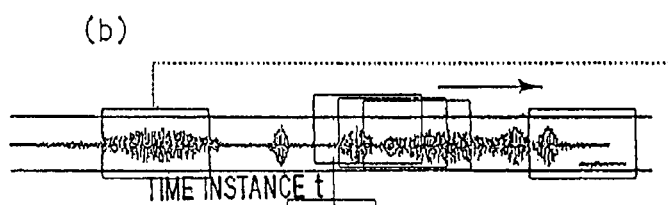
TIME INSTANCE t
FIG.5C
(c)
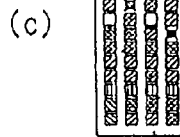
FIG.5D
(d)
| ID | TIME INSTANCE | FLAG | FEATURE VECTOR |
|---|---|---|---|
| 1 | 3:15 ~ 3:20 | REGISTER |  |
| 2 |  |  |  |
FIG.5E
(e)
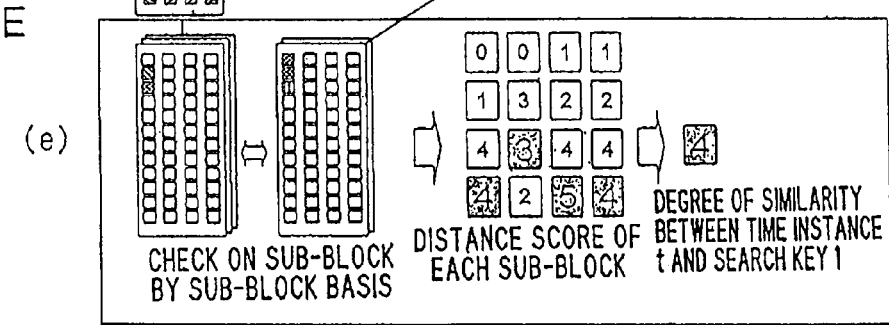
CHECK ON SUB-BLOCK BY SUB-BLOCK BASIS  ⇒  DISTANCE SCORE OF EACH SUB-BLOCK  ⇒  DEGREE OF SIMILARITY BETWEEN TIME INSTANCE t AND SEARCH KEY 1
FIG.5F
(f)
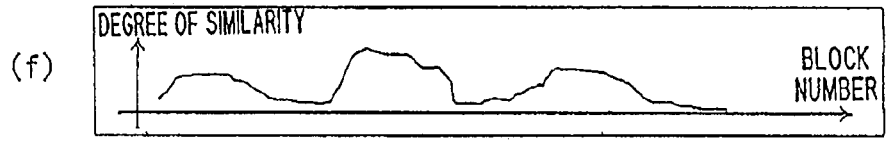

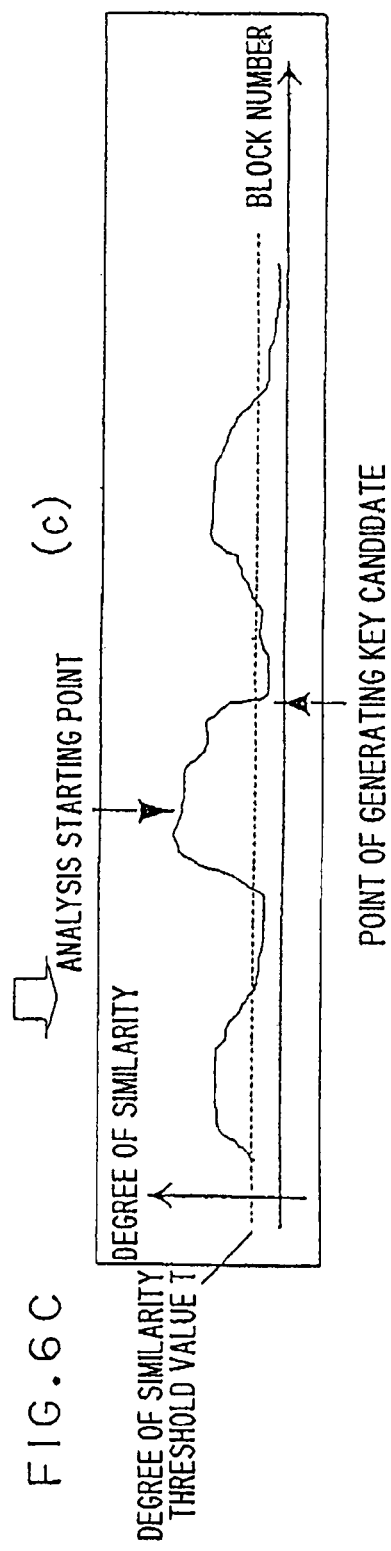

| ID | TIME INSTANCE | FLAG | FEATURE VECTOR |
|---|---|---|---|
| 1 | 3:15 ~ 3:20 | REGISTER | |
| 2 | 8:25 ~ 8:30 | REGISTER | |
| 3 | 9:05 ~ 9:10 | CANDIDATE | |

FIG. 7C (c)

| BLOCK NUMBER / ID | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 3 | 2 | 0 | 8 | 7 | 4 | 1 | 2 | 5 | 4 | 1 | 0 | 0 | 0 |
| 2 | 0 | 1 | 2 | 1 | 1 | 3 | 6 | 5 | 4 | 3 | 0 | 1 | 0 | 0 |
| 3 | 0 | 0 | 5 | 0 | 1 | 0 | 0 | 0 | 0 | 1 | 8 | 0 | 0 | 0 |

FIG. 7D (d)

| BLOCK NUMBER / ID | 1 | 2 | 3 |
|---|---|---|---|
| 1 | | 3 | 0 |
| 2 | 3 | | 0 |
| 3 | 0 | 0 | |

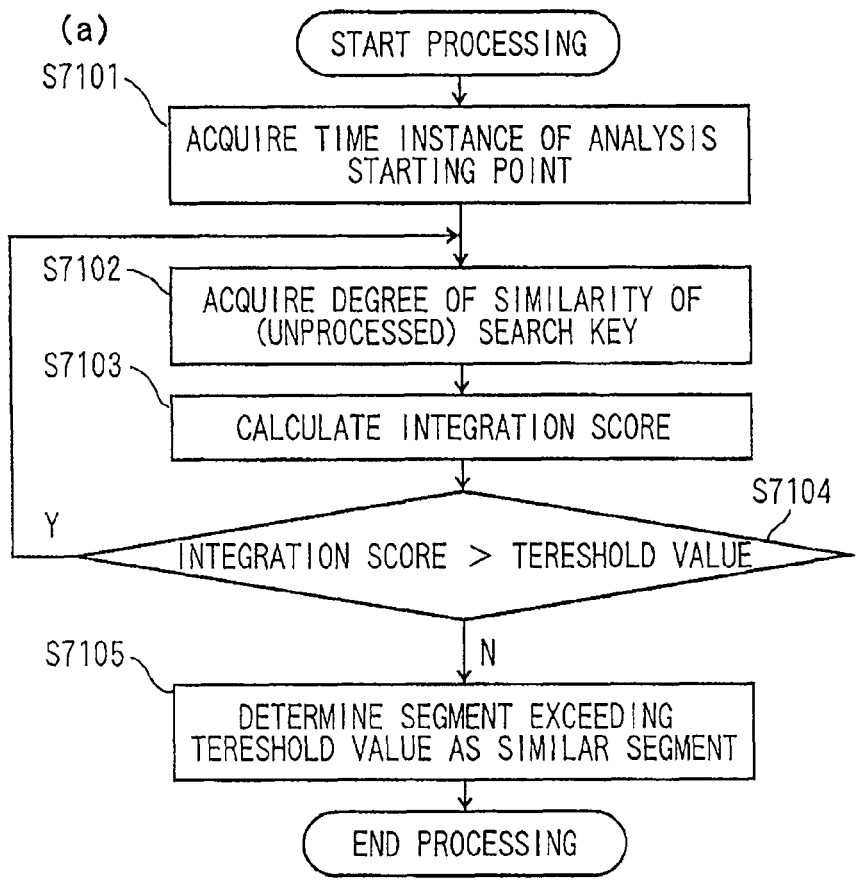

(b)

ANALYSIS STARTING POINT (c)

POINT OF GENERATION OF KEY CANDIDATE

VIDEO EDITING APPARATUS

TECHNICAL FIELD

The present invention relates to video editing.

BACKGROUND ART

Patent Document 1 proposes a video editing method utilizing a sound analysis technology. This method detects silence with no utterance, points where the type of sound is changed or the like automatically as editing points, and presents video segments included in the editing points to a user as edition fragments.

[Patent Document 1] JP-A-2004-23798

DISCLOSURE OF INVENTION

Problems to be Solved by the Invention

However, with the method disclosed in Patent Document 1, when an unknown sound source which cannot be prepared for in advance is mixed, or when plural sound sources are superimposed at the same time instance, there arises an excessive division or an erroneous integration of scenes (instances). Therefore there is a problem in that time and care of the user in the video editing cannot be reduced.

In order to solve the above-described problem, it is an object of the present invention to provide a video editing apparatus in which part of video can be extracted efficiently.

Means for Solving the Problems

The present invention is a video editing apparatus including: a dividing unit configured to divide a sound signal included in video data into plural blocks along a time axis; an extracting unit configured to analyze the sound signal and extract a feature vector in each of the blocks; a managing unit configured to manage at least the one feature vector as a search key; a first calculating unit configured to match the feature vector extracted by the extracting unit to the search key managed by the managing unit respectively in each of the blocks and calculate a first degree of similarity between the search key and the feature vector; a key candidate generating unit configured to acquire the feature vector the first degree of similarity of which is small from the extracting unit and generate a key candidate; a second calculating unit configured to match the feature vector extracted by the extracting unit to the key candidate respectively in each of the blocks and calculate a second degree of similarity between the key candidate and the feature vector; a storage unit configured to store the first degree of similarity and the second degree of similarity in each of the blocks; a registering unit configured to calculate a co-occurrence score from the first degree of similarity and the second degree of similarity, determine whether or not the key candidate is to be registered as the search key on the basis of the co-occurrence score and additionally register the key candidate determined to be registered to the managing unit as the search key; a cutting out unit configured to obtain an integration score in each of the blocks from the degrees of similarity of the search key managed by the managing unit in each of the blocks, and cut out a video corresponding to the block having the integration score exceeding an integration threshold value as one segment.

Advantages of the Invention

According to the present invention, part of video can be extracted efficiently.

BRIEF DESCRIPTION OF THE DRAWINGS

FIG. 3 is a drawing showing an example of a sound signal to be edited.

FIG. 8($a$) is a flowchart showing a flow of a cutting out unit, and FIG. 8($b$) is an explanatory drawing of an integration score.

REFERENCE NUMERALS

Figure 1:
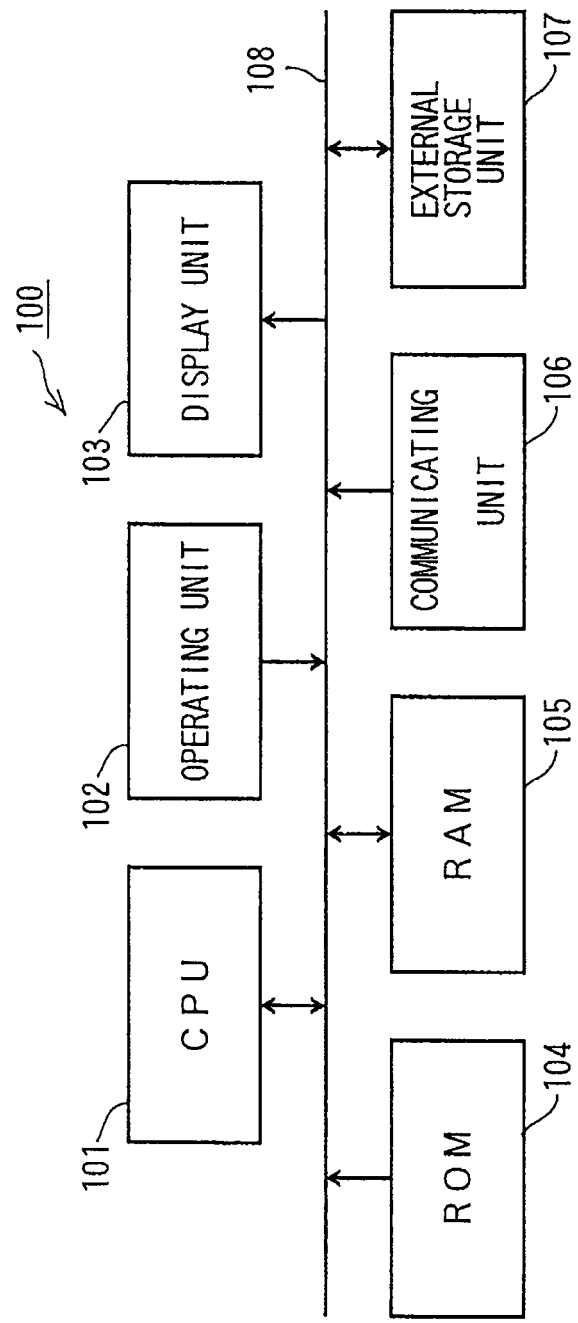
FIG. 1 is a drawing showing a configuration of a video editing apparatus according to embodiments.

11 . . . voice acquiring unit, 21 . . . dividing unit, 31 . . . extracting unit, 41, 42 . . . calculating unit, 51 . . . managing unit, 61 . . . storage unit, 71 . . . cutting out unit, 81 . . . key candidate generating unit, 91 . . . registering unit

BEST MODES FOR CARRYING OUT THE INVENTION

Referring now to the drawings, a video editing apparatus according to an embodiment of the present invention will be described.

FIG. 1 is a drawing showing an example of a hardware configuration of a video editing apparatus 100. The video editing apparatus 100 includes a CPU 101, principal storage units such as a ROM (Read Only Memory) 104 or a RAM (Random Access Memory) 105 configured to memorize various data and various programs, an external storage unit 107 such as an HDD (Hard Disk Drive), a CD (Compact Disk) drive device or the like configured to memorize various data and various programs, and a bus 108 configured to connect these devices, and has a normal hardware configuration using a computer. A display unit 103 configured to display information, an operating unit 102 such as a keyboard, a mouse or the like configured to receive command inputs from users, and a communicating unit 106 configured to control communication with an external apparatus are connected to the video editing apparatus 100 respectively with cables or via wireless.

Subsequently, various functions realized by the CPU 101 of the video editing apparatus 100 executing various programs stored in a storage unit or the external storage unit 107 in this hardware configuration will be described.

Embodiment 1

Referring now to FIG. 2 to FIG. 8, the video editing apparatus 100 in Embodiment 1 of the present invention will be described.

The video editing apparatus 100 in the present embodiment lightens an editing work by dividing video data including plural scenes into scenes further accurately and extracting a target scene efficiently.

Figure 2:
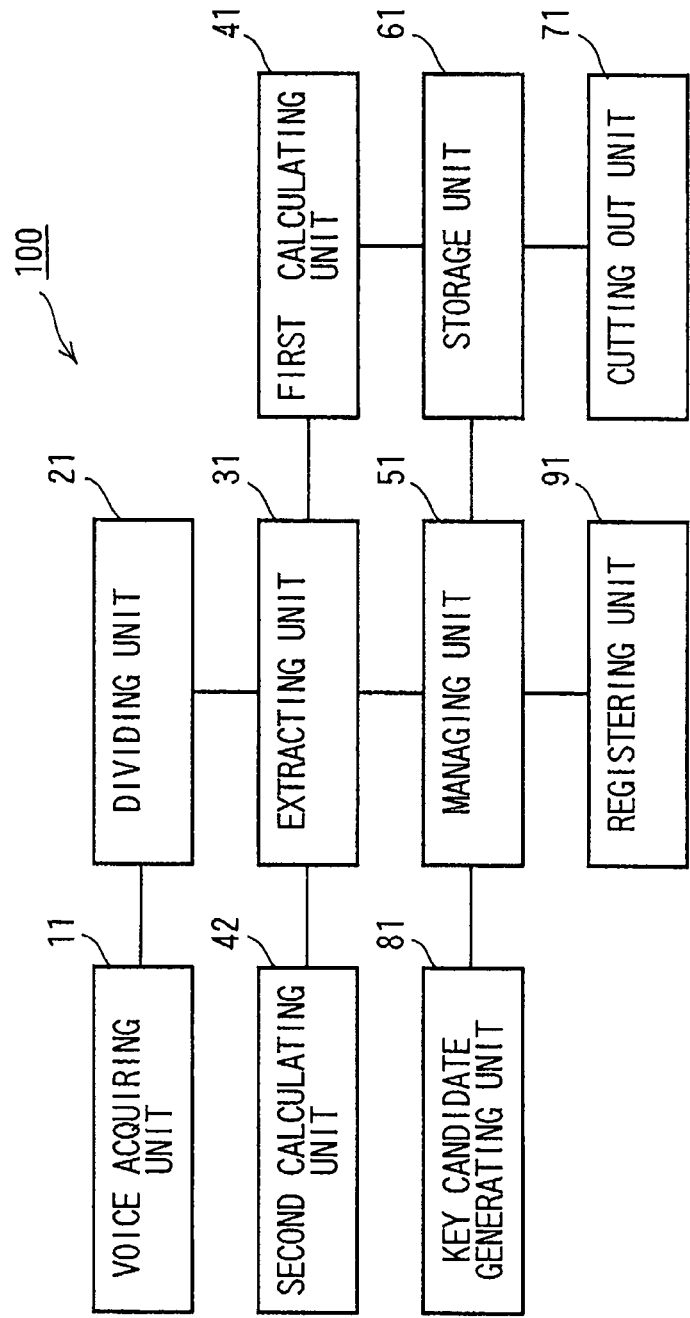
FIG. 2 is a block diagram showing the video editing apparatus according to an embodiment 1.

Referring now to FIG. 2, a configuration of the video editing apparatus 100 will be described. FIG. 2 is a block diagram of the video editing apparatus 100.

As shown in FIG. 2, the video editing apparatus 100 includes a voice acquiring unit 11, a dividing unit 21, an extracting unit 31, a first calculating unit 41, a second calculating unit 42, a managing unit 51, a storage unit 61, a cutting out unit 71, a key candidate generating unit 81, and a registering unit 91.

The voice acquiring unit 11 extracts a sound signal to be analyzed from video data to be edited and outputs the sound signal to the dividing unit 21. The method of input of the sound signal is not specifically limited. For example, a configuration in which real time acquisition from the voice acquiring unit 11 having a microphone, an amplifier, and an AD converter may also be applicable. Also, a configuration in which acquisition is achieved by reading a sound signal stored in a storage device as a digital signal is also applicable. When a configuration in which digital video data can be acquired from an external digital video camera, a receiving tuner such as a digital broadcasting, or other digital recording apparatuses is employed, a separating and extracting process is performed to extract only a sound signal and output to the dividing unit 21.

The dividing unit 21 divides the sound signal supplied from the voice acquiring unit 11 into segments having duration along a time axis. Segments of the sound signal divided by the dividing unit 21 are referred to as blocks, hereinafter. The dividing unit 21 outputs sound signals included in these blocks to the extracting unit 31. By performing the unit of division into blocks in the same duration as a basic unit in generation of search keys, calculation of degrees of similarity, or division into scenes described later, the processes to be performed in the downstream steps become easy. It is also applicable to set the blocks so as to be overlapped temporally with adjacent blocks. It is also applicable to set the duration of the blocks to variable lengths. In such a case, efficient process is achieved by outputting the sound signal after having subtracted the overlapped temporal area to the extracting unit 31.

The extracting unit 31 analyzes sound signals supplied from the dividing unit 21 in each of the blocks and converts into feature vectors. The feature vectors are for being compared and matched to sound signals contained in other blocks. The extracting unit 31 outputs the feature vectors along with the respective block numbers k to the first calculating unit 41, the second calculating unit 42, the managing unit 51, and the cutting out unit 71.

The first calculating unit 41 makes a feature vector supplied from the extracting unit 31 to a feature vector corresponding to a search key registered in the managing unit 51, measures the similarity between the feature vectors according to a predetermined distancescale, and outputs the measurement to the storage unit 61 as a degree of similarity. Also, the second calculating unit 42 matches the feature vector supplied from the extracting unit 31 to a feature vector corresponding to a key candidate generated by the key candidate generating unit 81, calculates the degree of similarity therebetween, and outputs the result to the storage unit 61 in the same manner as described above.

The managing unit 51 includes at least one search key used for matching by the first calculating unit 41 registered therein. The search key to be managed is supplied from the extracting unit 31 and is a feature vector of the corresponding block. However, another method of registering such as holding only corresponding temporal information may also be applicable. Also, the managing unit 51 also performs additional registering and deleting of search keys, that is, adds search keys to be registered as new search keys from among key candidates which satisfy conditions or deletes those which do not satisfy the conditions.

The storage unit 61 memorizes at least one search key registered in the managing unit 51 and degrees of similarity of the sound signals to be analyzed in each of the blocks. In the same manner, the key candidates generated by the key candidate generating unit 81 and the degrees of similarity in time series including plural the degrees of similarity in each of the blocks are also memorized. The degrees of similarity in time series can be managed in "rows" for search keys and "columns" for blocks in corresponding time series, for example, as shown in FIG. 7(c). The storage unit 61 stores and memorizes the degrees of similarity for the respective combinations in a matrix pattern as elements of row and columns. The key candidates are memorized in the same manner.

The degrees of similarity in time series memorized in the storage unit 61 are used for a scene division by the cutting out unit 71 and registration of a new search key by the registering unit 91.

The cutting out unit 71 references the degrees of similarity in time series memorized in the storage unit 61, and cuts out a video segment which can be determined to be the same scene on the basis of the degree of similarity corresponding to the search key registered in the managing unit 51 as one segment.

In order to avoid the similar segment from being excessively divided, the key candidate generating unit 81 estimates a candidate segment for adding plural sound signals as the search keys from the same scene and adds the same to the managing unit 51 as key candidates.

The registering unit 91 determines whether the continuity as the scene is maintained by determining whether or not the key candidate newly registered by the key candidate generating unit 81 is generated from the same scene as the already registered search key by the managing unit 51. In order to determine the continuity of the scene, the registered search key from among the degrees of similarity memorized in the storage unit 61 and the degree of similarity sequence of the key candidate are compared.

In this manner, the video editing apparatus 100 in the present embodiment renews information on degrees of similarity in the storage unit 61 while adding the search keys for determining to be same scene from the sound signal itself to be analyzed, and cuts out a coherent scene on the basis of the degrees of similarity of plural the search keys.

Referring now to the case in which the sound signal shown in FIG. 3 is supplied as a motif, actions of respective components of the video editing apparatus 100 will be described. As shown in FIG. 3, the sound signal to be analyzed includes three segments (scene 1, scene 2, scene 3) and different types of music are co-occurring in the respective segments. The scene 2 includes handclaps mixed therein from the midsection of the scene, so that plural sound sources co-exist in one scene.

Figure 4B:
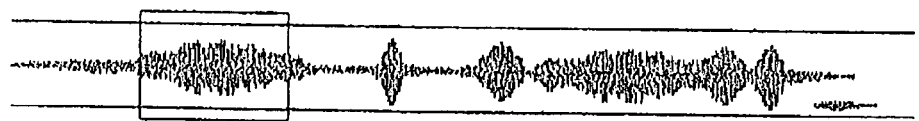
FIG. 4($a$) is a flowchart showing a flow of an extracting unit, and FIGS. 4($b$) to ($f$) are drawings showing an outline of the extracting unit.

First of all, detailed actions of the extracting unit 31 will be described with reference to FIG. 4. FIG. 4(a) is a flowchart showing actions of the extracting unit 31 and FIGS. 4(b) to (f) are diagrammatic sketches of algorithm for extracting features from speech waveforms.

In Step S3101, the extracting unit 31 acquires sound signals included in a segment to be analyzed as shown in FIG. 4(b).

Figure 4C:
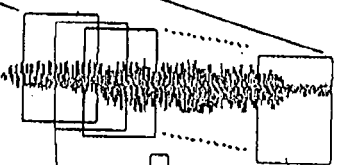

In Step S3102, the extracting unit 31 divides the sound signals into frame units suitable for extracting the features as shown in FIG. 4(c). The reason for division is that the acquired sound signal may include a signal sequence longer than the frame unit suitable for the feature extraction. An arbitrary duration may be set as the frame unit. Here, the frame length is set to 25 msec., and the frame shift is set to 10 msec.

Figure 4D:
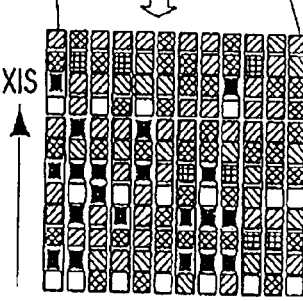

In Step S3103, the extracting unit 31 performs conversion into frequency spectrum on the frame-by-frame basis as shown in FIG. 4(d). In other words, a spectrum analysis is performed. For example, fast Fourier transform (FFT) is employed as a method of analysis to achieve conversion into the frequency spectrum as a power spectrum sequence of plural bands on the basis of the speech waveform included in the frame length. FIG. 4(d) shows a conceptual drawing showing a spectrum sequence on the frame-by-frame basis. In this drawing, the magnitudes of the spectrum power values are expressed by being replaced with black, white, and hatching. Other drawings are also expressed in the same manner.

Figure 4E:
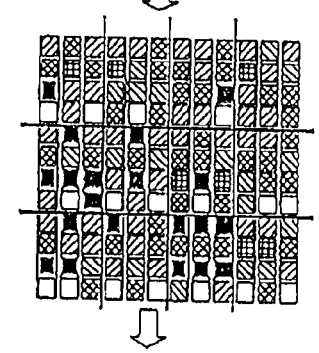

In Step S3104, the extracting unit 31 divides the frequency spectrum sequence into sub-blocks, that is, into plural durations and frequency bands as shown in FIG. 4(e). For example, as shown in FIG. 4(e), several adjacent time frames are grouped into one sub block and the frequency band is divided in the same manner. The reason for dividing into the sub-blocks is as follows. If the spectrum sequence of the respective frames included in the block is employed as a feather vector as-is, local fluctuations are reflected as-is on the feature vector due to the difference in extent of superimposition of noise sources depending on the frequency band of the sound signal.

Figure 4F:
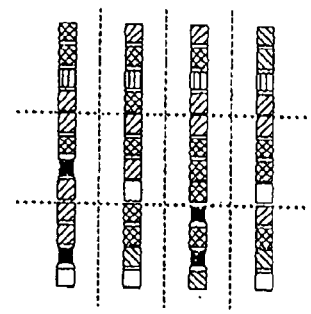

In Step S3105, on the basis of divided sub-block unit, the extracting unit 31 generates a representative vector from plural vectors included in the sub block, and the representative vector of the time series is generated as the feature vector as shown in FIG. 4(f). Examples of a method of generating the representative vector include a method of employing an average value of the vector, and a method of detecting a peak from the difference from the adjacent band and employing cumulative of peaks included in the respective bands as a vector value.

Figure 5A:
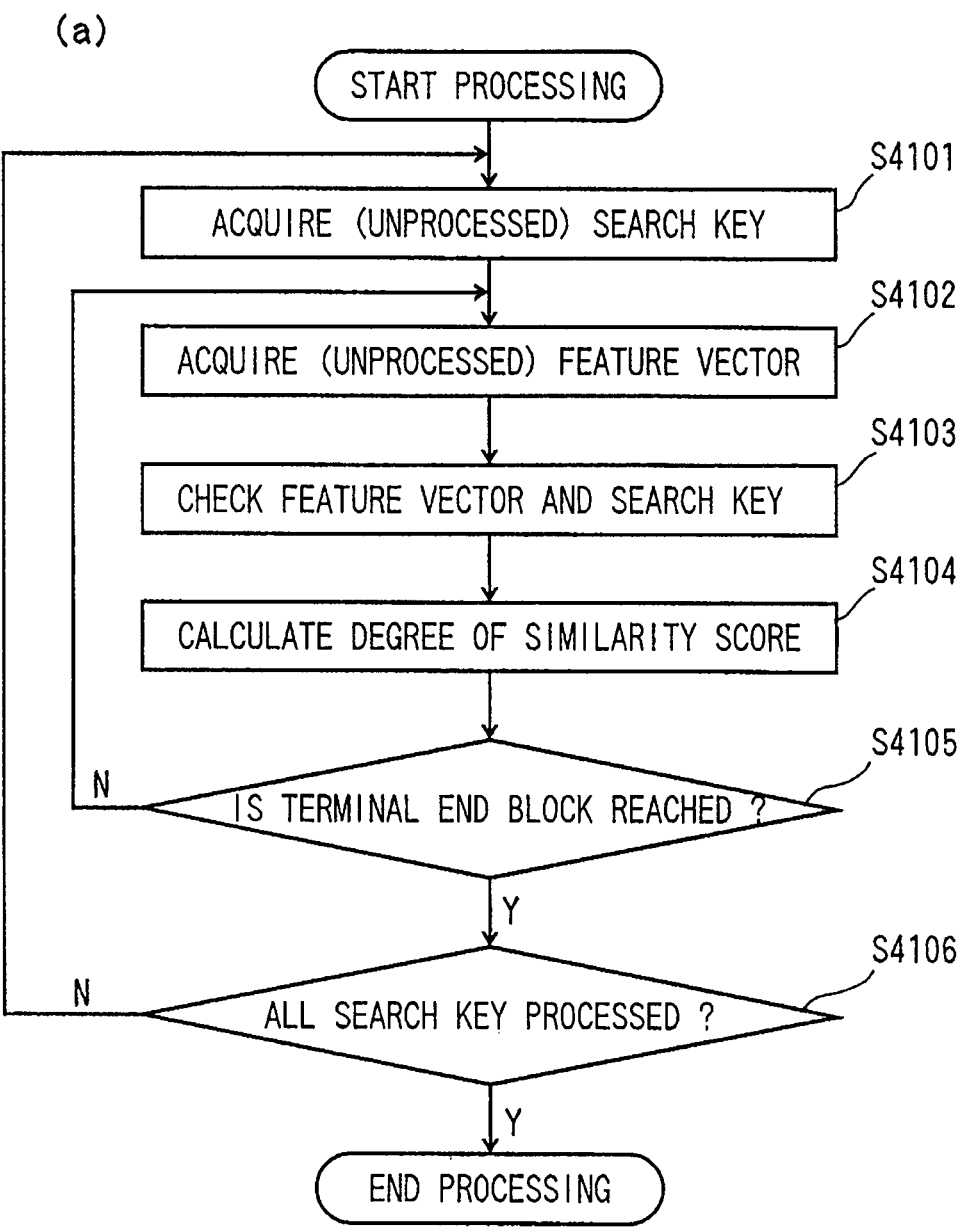
FIG. 5($a$) is a flowchart showing a flow of a calculating unit, and FIGS. 5($b$) to ($f$) are drawings showing an outline of the calculating unit.

Subsequently, detailed actions of the first calculating unit 41 will be described with reference to FIG. 5. FIG. 5(a) is a flowchart showing actions of the first calculating unit 41 and FIGS. 5(b) to (f) are diagrammatic sketches of algorithm for calculating the degree of similarity.

In Step S4101, the first calculating unit 41 takes out unprocessed search keys from among search keys registered in the managing unit 51 as shown in FIGS. 5(b) and (d). FIG. 5(d) shows an example of information registered in the managing unit 51. In the managing unit 51, an ID, which is a serial number of the search key, time instant information on the extracted sound signal, a flag showing whether the search key is a key candidate or a registered search key, and a feature vector generated by the extracting unit 31 are registered as related information on the search key. Here, the description of the process is given on the assumption that a search key having a serial number ID "1" (hereinafter, referred to as "search key 1") is taken out.

In Step S4102, the first calculating unit 41 acquires a feature vector included in the unprocessed block on the basis of the sound signal to be analyzed as shown in FIGS. 5(b) and (c). Here, the process is continued on the assumption that a feature vector is extracted at the time instant t.

In Step S4103, the first calculating unit 41 matches the feature vectors of the search key 1 and the time instant t as shown in FIG. 5(e). There are various methods as the match between the feature vectors. Here, a method of matching separately for each of the sub blocks, and calculating an inverse number of Euclidean distance of the feature vector included in each sub block as a degree of similarity S in the sub block. Here, the following expression (1):

$$Sij = \frac{K}{\sum_{x=0}^{X-1}(Key_{(i,j*X+x)} - \alpha * Vec(t)_{(i,j*X+x)})} \quad (1)$$

where Key(i, j) is a spectrum power value at the $i^{th}$ sub-block (the number of blocks in a maximum time is I) and the $j^{th}$ frequency band (the number of maximum band is J) of the search key, Vec(t)$_{(i,j)}$ is the spectrum power value at the $i^{th}$ sub-block and the $j^{th}$ frequency band of the feature vector, $\alpha$ is a normalization factor between the feature vectors, and K is a normalization factor of the degree of similarity score, is satisfied.

The degrees of similarity $S_{ij}$ on the sub-block by sub-block basis is calculated using the expression (1).

In Step S4104, the first calculating unit 41 integrates the degrees of similarity $S_{ij}$ calculated in the respective sub-blocks and calculates the degree of similarity of the blocks of the search key 1 and the time instant t on the basis of the expression (2) shown below.

$$S(a, t) = \frac{1}{I}\sum_{i=0}^{I-1} \max_{j}(S_{ij}) \quad (2)$$

In the expression (2), a is an ID number of a search key.

The expression (2) selects degrees of similarity of the maximum frequency bands in the respective blocks and averages the degrees of similarity among the plural blocks.

In Step S4105, the first calculating unit 41 performs the process from Step S4102 to S4104 until a terminal block is reached. When the terminal block is reached, a degree of similarity curve in time series as shown in FIG. 5(f) is obtained. In this drawing, the vertical axis represents the degree of similarity, the horizontal axis represents the block number, that is, the time axis. Then, the procedure goes to Step S4106 (the case of Y). In contrast, if not reached, the procedure goes back to Step S4102 (the case of N).

In Step S4106, the first calculating unit 41 performs the process from Step S4101 to S4105 until there remains no search key registered in the managing unit 51. In other words, when all of the search keys are processed, the degree of similarity in time series is calculated for plural the search keys (the case of Y), and the procedure is ended. In contrast, if there is any unprocessed search key, the procedure goes back to Step s4101 (the case of N).

In contrast, the second calculating unit 42 is capable of calculating the degree of similarity in time series for the candidate keys registered in the managing unit 51 by processing in the same manner as the first calculating unit 41 for obtaining the degree of similarity in time series for the search keys registered in the managing unit 51.

Figure 6A:
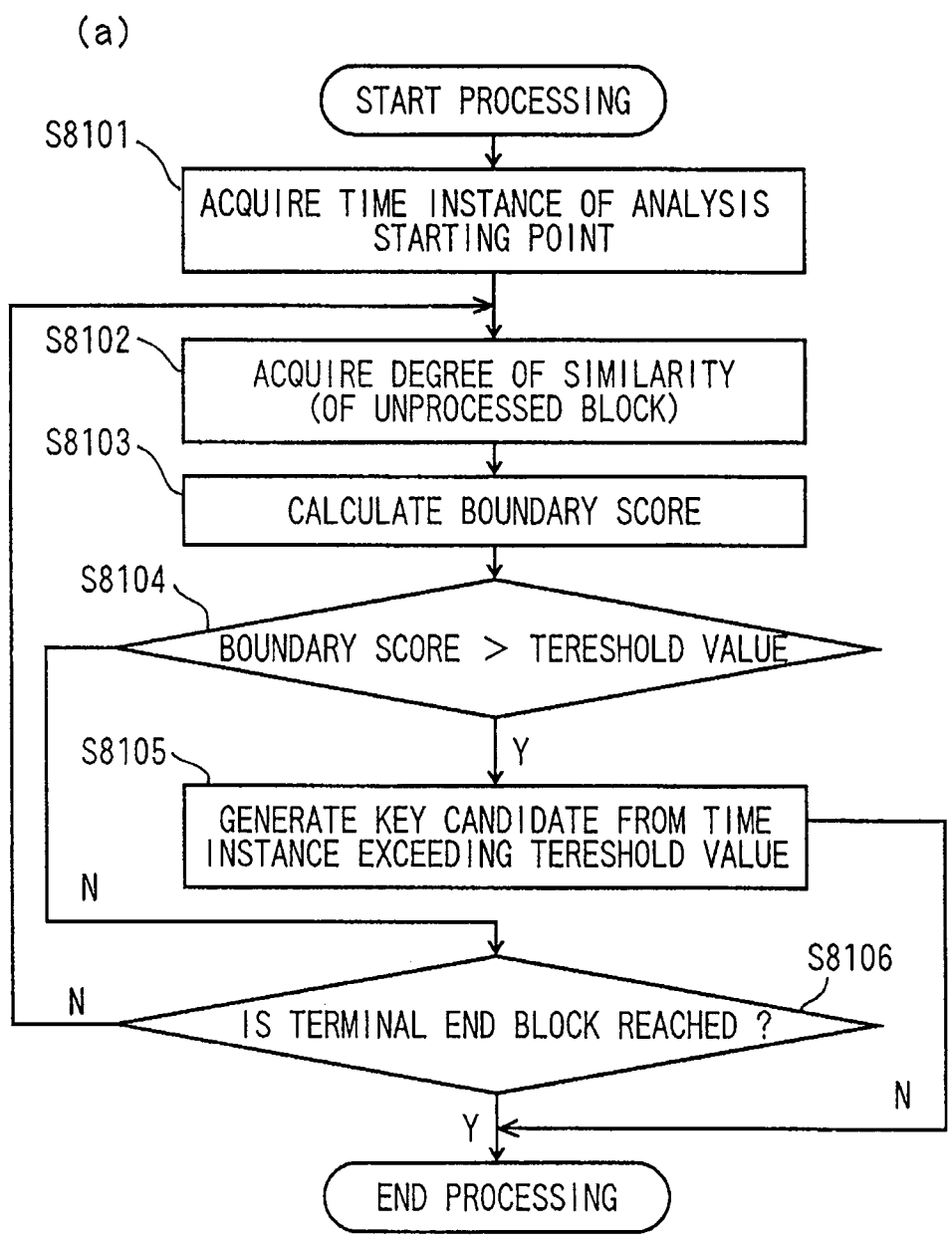
FIG. 6($a$) is a flowchart showing a flow of a key candidate generating unit, and FIGS. 6($b$) and ($c$) are drawings showing an outline of a result of processing of the key candidate generating unit.

Subsequently, detailed actions of the key candidate generating unit 81 will be described with reference to FIG. 6. FIG. 6(a) is a flowchart showing actions for generating key candidates, and FIGS. 6(b) and (c) show an outline of the result of processing of the key candidate generating unit 81.

In Step S8101, the key candidate generating unit 81 acquires the analysis starting point for searching the position for generating the key candidate. The position to be determined as the analysis starting point is a position for generating one of the search keys registered already in the managing unit 51. Hereinafter, this search key is referred to as "stating point search key". It is assumed that one search key is registered in the managing unit 51 before generating the key candidate, and the degree of similarity thereof is memorized in the storage unit 61.

In Step S8102, the key candidate generating unit 81 starts searching from the analysis starting point toward the future (the positive direction) of the time axis, and acquires the degrees of similarity of the unprocessed blocks relating to the starting point search key from the storage unit 61. The term "unprocessed blocks" means blocks from the analysis starting point onward.

In Step S8103, the key candidate generating unit 81 calculates a boundary score R relating to the starting point search key. The boundary score R is calculated using the following expression (3) which accumulates the differential values when being smaller than a degree of similarity threshold value T, where the degree of similarity threshold value T is a degree of similarity for determining the similarity for example.

$$R_{k+1} = R_k + (T - S_k) \text{ if } T > S_k \quad (3)$$

where k is a block number and $S_k$ is a degree of similarity of the block number k relating to the starting point search key.

In Step S8104, the key candidate generating unit 81 determines whether the accumulated boundary score $R_{k+1}$ exceeds the boundary score threshold value RT. If the accumulated boundary score $R_{k+1}$ exceeds the boundary score threshold value RT, the procedure goes to Step S8105 (the case of Y), and if not, the procedure goes to Step S8106 (the case of N). In other words, the similarities with the starting point search key are obtained in the sequence in time series, and the feature vectors having the degree of similarity lower than the starting point search key are employed as the key candidates. The feature vectors having lower degrees of similarity than the starting point search key are referred to as feature vectors at positions which become dissimilar. Then, the reason why the accumulated boundary scores are used is to eliminate positions which temporarily become dissimilar to the starting point search key, and is to select only when the dissimilar state is continued for a predetermined period.

In Step S8105, since the accumulated boundary score $R_{k+1}$ exceeds the boundary score threshold value RT as shown in FIG. 6(c), the key candidate generating unit 81 generates a new key candidate at a position where the degree of similarity is fallen below the degree of similarity threshold value T for the first time. Here, "generate a key candidate" means to obtain the feature vector corresponding to the block at the position where the degree of similarity is fallen below the degree of similarity threshold value T for the first time from the extracting unit 31 and set the obtained feature vector as a key candidate.

In Step S8106, if the state in which the accumulated boundary score Rk+1 exceeds the boundary score threshold value RT is continued and the terminal end block is not reached, the key candidate generating unit 81 repeats the process from the S8102 to S8104 described above (the case of N), and if the terminal end block is reached, the procedure is ended (the case of Y).

For reference sake, in order to simplify the description, the boundary score R is described to be continuously accumulated. However, other various methods such as resetting the boundary score R are possible if it is not fallen below the threshold value for a certain segment.

Figure 7A:
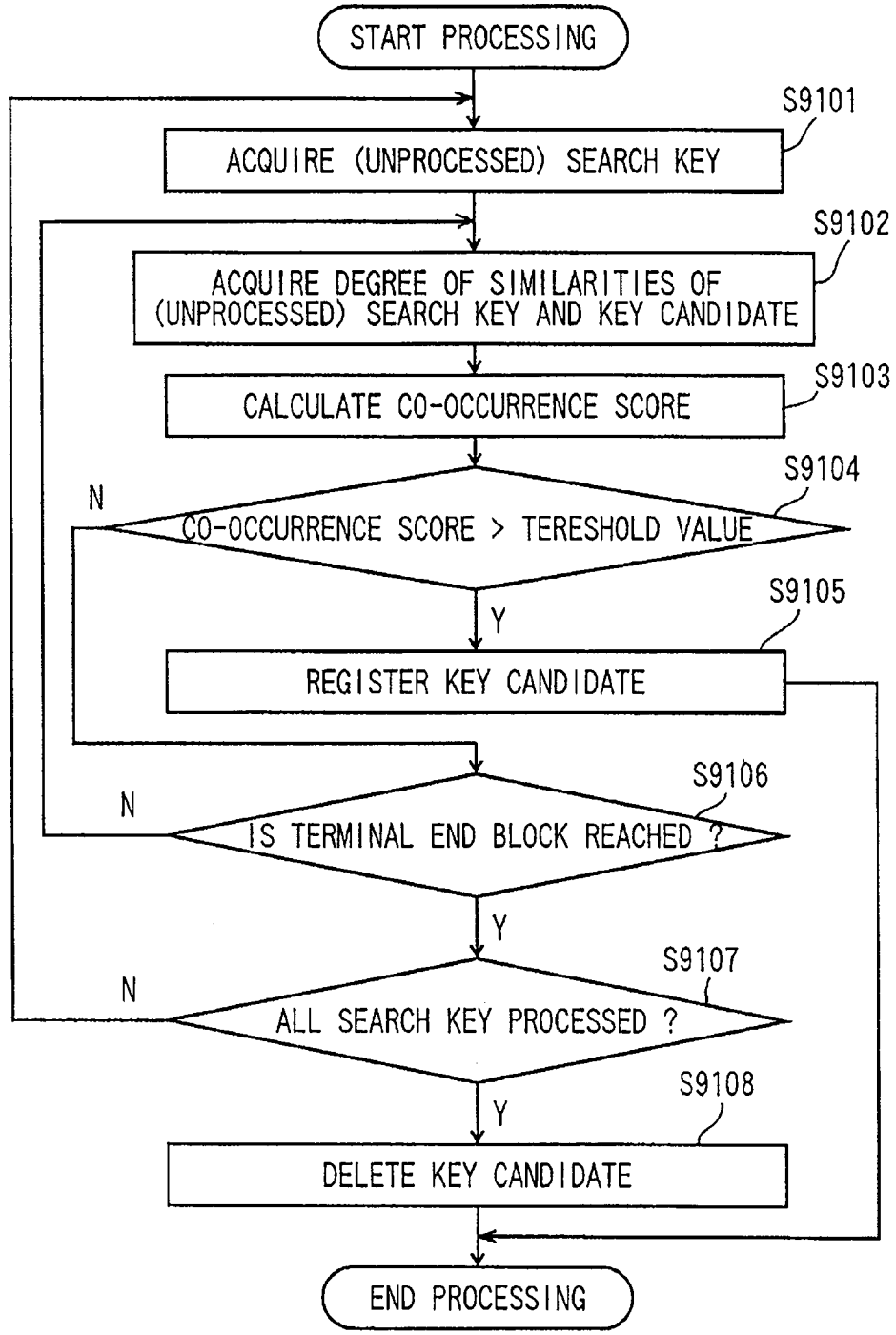
FIG. 7($a$) is a flowchart showing a flow of a registering unit, and FIGS. 7($b$) to ($d$) are drawings showing an outline of a result of processing of the registering unit.

Referring now to FIG. 7, detailed actions of the registering unit 91 will be described. FIG. 7(a) shows a flowchart showing actions of the registering unit 91, and FIGS. 7(b) to (d) shows detailed examples about an object to be processed by the registering unit 91.

As shown in FIG. 7(b), a case where two search keys (search key 1 and search key 2) are registered already in the managing unit 51, and whether or not a third new key candidate is to be registered as a search key is determined will be described.

In Step S9101, the registering unit 91 specifies a search key having an ID=1 as an unprocessed search key.

In Step S9102, the registering unit 91 acquires a degree of similarity 3 of the search key 1 and a degree of similarity 0 of the key candidate 3 in a block 1 from the degree of similarity storage unit 61 as shown in FIG. 7(c).

In Step S9103, the registering unit 91 calculates a co-occurring score using these degrees of similarity. The term "co-occurrence score" is a score into which the similarities of the sound signals included in the same time instance (the same block) is converted relating to the search key and the key candidate. There are various methods of calculating the co-occurrence score. Examples include a method shown below. The degree of similarity threshold for determining the presence or absence of the similarity between the sound signal and the search key in the corresponding block is set to 3. Then, the co-occurrence score is set to 1 when both of the two keys to be compared exceed the degree of similarity threshold value, and set to 0 when it does not exceed. An example of calculation of the co-occurrence scores expressed in this manner is shown in FIG. 7(d). As shown in FIG. 7(d), the search key 1 exceeds the degree of similarity threshold value. However, since the key candidate 3 does not exceed the degree of similarity threshold value, the co-occurrence score is 0. If the co-occurrence scores of the adjacent blocks are accumulated, the number of blocks continuously co-occurred can be expressed.

In Step S9104, the registering unit 91 compares the calculated co-occurrence score and a co-occurrence threshold value. Here, the co-occurrence threshold value is set to 2, for example. Then, since the co-occurrence score of the search key 1 and the key candidate 3 is 0 in the block 1, the procedure goes to Step S9106 (the case of N). When the co-occurrence score is 2 or higher, the procedure goes to Step S9105 (the case of Y).

In Step S9105, the registering unit 91 registers the key candidates whose co-occurrence scores exceed the co-occurrence threshold value as the search key, and ends the procedure.

In Step S9106, the registering unit 91 goes to Step S9107 if the process is finished to the terminal block (the case of Y), and repeats the process from Step S9102 to S9105 if the process is not finished (the case of N). As regards the search key 1 and the key candidate 3, the co-occurrence score does not exceed the threshold value even though the same process is repeated, and hence the procedure goes to Step S9107.

In Step S9107, the registering unit 91 repeats the process from Step S9101 to S9106 if the process is not finished for all the search keys (the case of N). In contrast, when finished (the case of Y), the procedure goes to Step S9108.

In Step S9108, the registering unit 91 deletes the key candidates.

In other words, in Step S9107, the registering unit 91 performs comparison between the search key 2 and the key candidate 3 for the next search key 2. Since the co-occurrence score does not exceed the co-occurrence threshold value also regarding the search key 2 and the key candidate 3, the procedure goes to Step S9108, and deletes the key candidate 3 from the managing unit 51.

In this detailed example, the search key 1 (generated from a segment only with music in Scene 2) and the search key (generated from a scene where music and handclaps are superimposed in Scene 2) already registered exceed the co-occurrence threshold value=2, respectively, in blocks 6, 9, and 10, and hence are determined to be co-occurred.

Referring now to FIG. 8, detailed actions of the cutting out unit 71 will be described. FIG. 8(a) is a flowchart showing actions of the cutting out unit 71, and FIG. 8(b) is an explanatory drawing of an integration score.

As actions of the cutting out unit 71, an example in which the third key candidate is deleted and the two search keys are registered by the managing unit 51 will be described as shown in FIG. 8(b).

In Step S7101, the cutting out unit 71 sets a block 4 where the search key 1 is generated as an analysis starting point. The search key 1 corresponds to the starting point search key.

In Step S7102, the cutting out unit 71 acquires the degrees of similarity of the search key 1 and the search key 2 in the block 4. From the example shown in FIG. 8(b), "8" and "1" are acquired, respectively.

In Step S7013, the cutting out unit 71 calculates the integration score in time sequence in which the degrees of similarity of plural search keys are integrated as shown in FIG. 8(b). There are various integrating methods. For example, the highest degree of similarity in a group of degrees of similarity in time series is employed as an integration score. In this case, "8" is employed.

In Step S7104, the cutting out unit 71 determines whether or not the integration score exceeds an integration threshold value in the sequence of blocks, that is, in the sequence of time series. When the integration threshold value is set to "3", the segment corresponding to the block 4 exceed the integration threshold value=3 (the case of Y), the process from Step S7102 to S7103 is repeated. In this case, since the integration score is reduced to below the integration threshold value at the time of reaching a block 11 (the case of N), the procedure goes to Step S7105.

In Step S7105, the cutting out unit 71 cuts out video (group of blocks) corresponding to the blocks from the block 4 to the block 10 exceeding the integration threshold value as a scene, which is a coherent segment. In other words, this segment corresponds to a scene that the user wants to cut out.

Although only the example of the end point search in which the search is performed from one analysis starting point toward the future has been described here for the simplification of description, a both-end search in which the search is performed from the respective analysis staring points toward the future and the past so as to approach with respect to each other by using two analysis starting points, or an entire block search in which the search is performed from the beginning to the end of the sound signal without providing the analysis starting point may also be employed.

According to the present embodiment, the search key can be generated dynamically from the object to be analyzed by the key candidate generating unit 81 without preparing a dictionary in advance before the cutting out of the scene. At this time, by generating the key candidates from the positions where a different sound source can be superimposed at the middle on the basis of the standard referred to as the boundary score, whether or not a common sound signal is included in these key candidates can be determined by the registering unit 91.

Therefore, even when the different sound source is superimposed, the video can be combined without excessively dividing the video, so that the cutting out of the scene in the video editing is efficiently facilitated.

Embodiment 2

Figure 9:
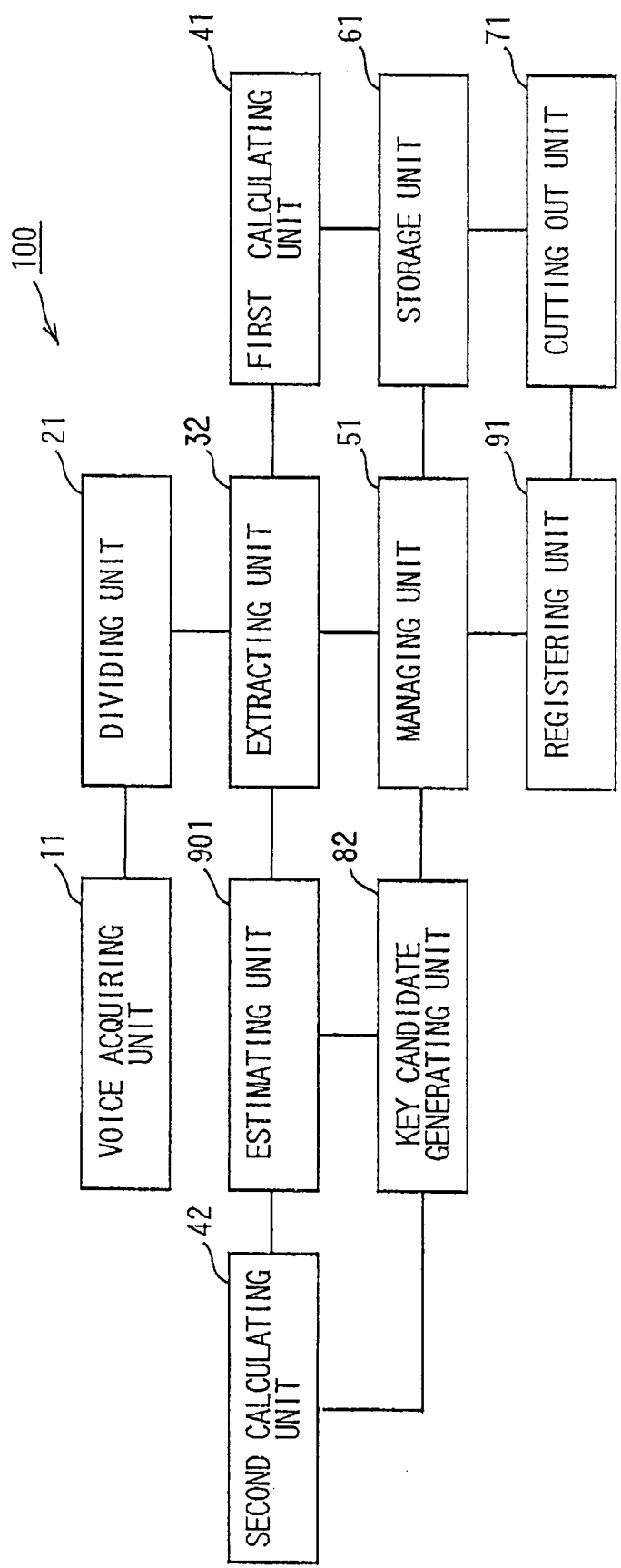
FIG. 9 is a block diagram showing the video editing apparatus according to an embodiment 2.

Referring now to FIG. 9 to FIG. 10, the video editing apparatus 100 in Embodiment 2 of the present invention will be described.

FIG. 9 is a block diagram of the video editing apparatus 100 according to the present embodiment.

As shown in FIG. 9, the video editing apparatus 100 includes the voice acquiring unit 11, the dividing unit 21, an extracting unit 32, the first calculating unit 41, the managing unit 51, the storage unit 61, the cutting out unit 71, a key candidate generating unit 82, the registering unit 91, and an estimating unit 101.

The present embodiment has a configuration in which the estimating unit 901 is added to the configuration in Embodiment 1, and is different from Embodiment 1 in that the positions to generate the key candidates are determined on the basis of the result of estimation of the sound source.

Since those denoted by the same reference numerals as the configuration in Embodiment 1 perform the same actions, description thereof is omitted.

The extracting unit 32 analyzes the sound signals in each of the blocks supplied from the dividing unit 21, converts the same into feature vectors which can be matched to the sound signals included in blocks at different time, and outputs the same to the first calculating unit 41, the managing unit 51, the cutting out unit 71, and the estimating unit 101.

The estimating unit 901 analyzes the feature vectors supplied from the extracting unit 32, estimates the sound sources included in the blocks, and outputs the results to the key candidate generating unit 82. There are various methods of estimating the sound source. For example, as one of the methods, a statistical dictionary such as Gaussian Mixture Models for each categories defined in advance is prepared, and a sound source having the highest score as a result of matching to the dictionary is estimated as a representative sound source in the corresponding block (hereinafter, referred to as "estimated sound source").

In order to avoid the similar segment from being excessively divided, the key candidate generating unit 82 estimates a segment for adding to the search key from a wide range of sound signals generated from the same scene, and registers the same to the managing unit 51 as key candidates.

In the present embodiment, the result from the estimating unit 901 is used for the estimation of the key candidates.

Referring now to detailed motif shown in FIG. 3, detailed actions of the present embodiment will be described.

In FIG. 3, the sound signal to be analyzed includes three segments (scene 1, scene 2, scene 3) and different types of music are co-occurring in the respective segment. The scene 2 includes handclaps mixed therein from the midsection of the scene, so that plural the sound sources co-exist in one scene.

Figure 10A:
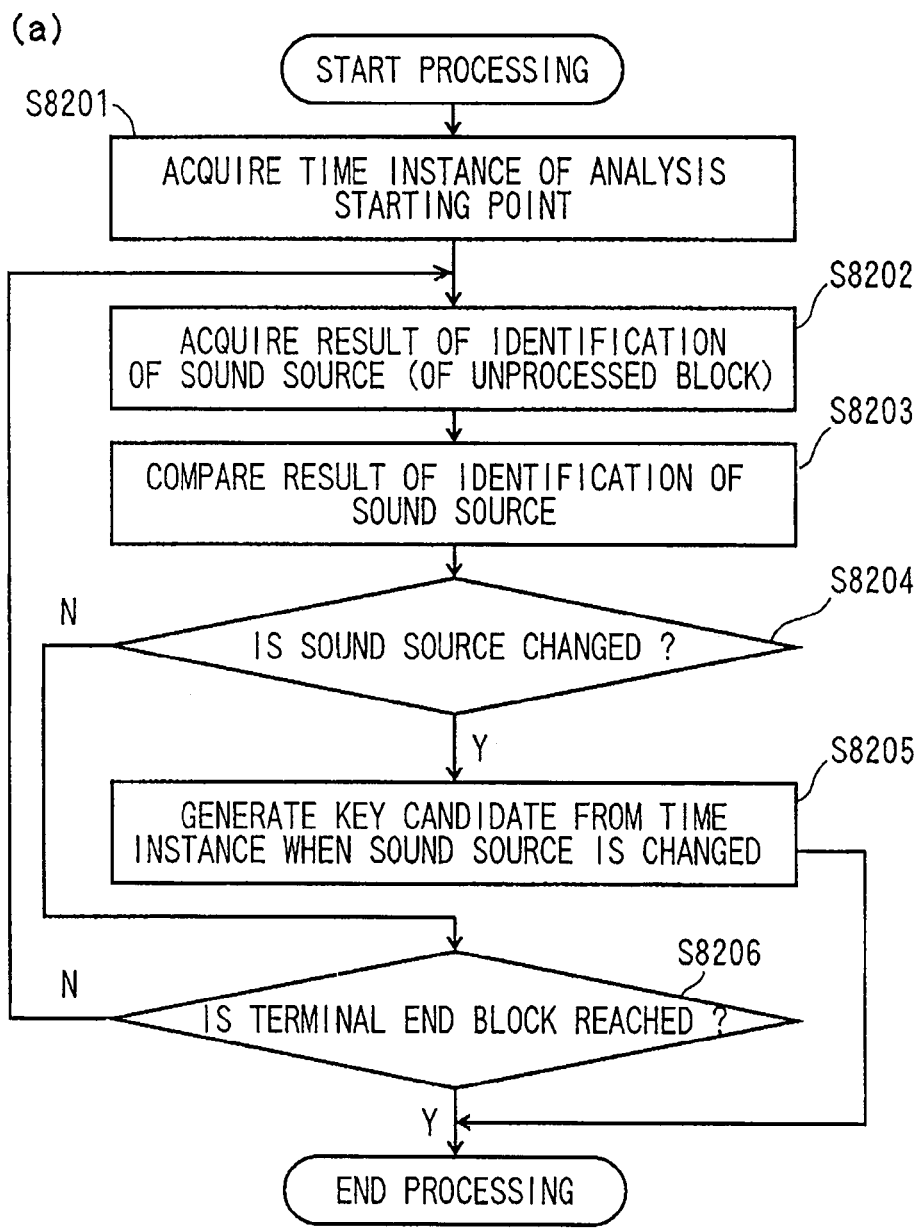
FIG. 10($a$) is a flowchart showing a flow of the key candidate generating unit, and FIGS. 10($b$) and ($c$) are drawings showing an outline of a result of processing of the key candidate generating unit.

Detailed actions of the key candidate generating unit 82 will be described with reference to FIG. 10. FIG. 10(a) is a flowchart showing detailed actions for generating key candidates, and FIGS. 10(b) and (c) show an outline of an estimated result supplied from the estimating unit 901 and the result of processing of the key candidate generating unit 81.

Figure 10B:
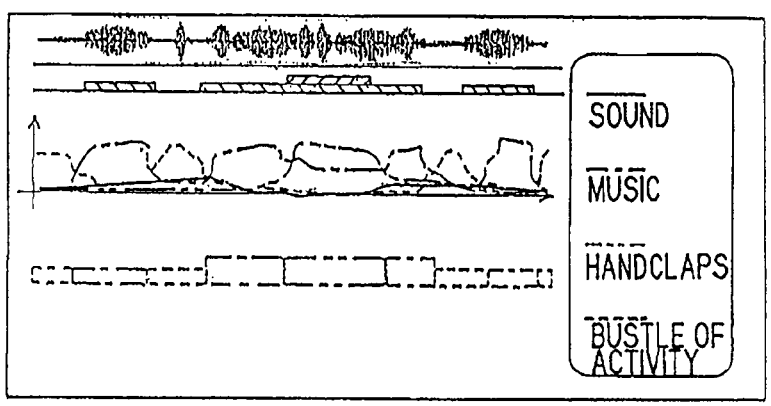

As shown in FIG. 10(b), the estimating unit 901 includes a dictionary of four types of sound sources including voice, music, handclaps, and bustle of activity prepared in advance, and representative sound sources of the respective blocks are allocated on the basis of the matching between the feature vectors and the dictionary. In the present embodiment, the key candidates are generated using the result of sound source estimation.

Figure 10C:
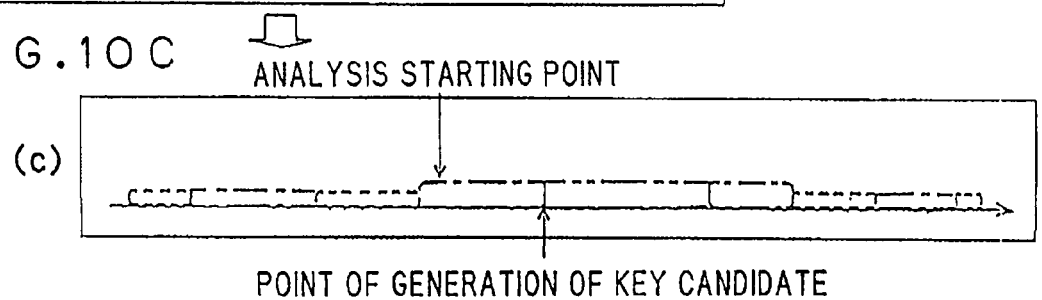

In Step S8201, the key candidate generating unit 82 acquires the analysis starting point for searching the position for generating the key candidate. For example, as shown in FIG. 10(c), the position of generation of the search key already registered in the managing unit 51 is determined as an analysis starting point.

In Step S8202, the key candidate generating unit 82 starts searching from the analysis starting point toward the future (the positive direction) of the time axis, and acquires the estimated sound source of the unprocessed block.

In Step S8203, the key candidate generating unit 82 compares the estimated sound source of the block being processed and the estimated sound source of the adjacent block.

In Step S8204, the key candidate generating unit 82 determines whether or not the estimated sound source changes and, if yes, the procedure goes to Step S8205 (the case of Y). In contrast, when the estimated sound source is not changed, the procedure goes to Step S8206 (the case of N).

In Step S8205, the key candidate generating unit 82 acquires the feature vector at the position where the estimated sound source is switched from music to handclaps from the extracting unit 32 and generates the same as a new key candidate as shown in FIG. 10(c).

In Step S8206, the key candidate generating unit 82 ends the procedure when the terminal end block is reached (the case of Y), and if not (the case of N), the procedure from Steps S8202 to S8204 is continued.

According to the present embodiment, the scene is determined to be one coherent scene (similar segment) by generating the key candidate from the position where the estimated sound source is changed and using plural added search keys.

In the related art, since the result of sound source estimation is used as a boundary of the similar segment as-is, excessive division is resulted. However, as in the present embodiment, by generating the search key from the scene where the sound source is changed and combining the segments in which the same background sound is included from the co-occurrence score of the degree of similarity with respect to the adjacent segment, cutting out of the scene intended by the user is achieved, so that time and care required for editing are reduced.

Embodiment 3

Figure 11:
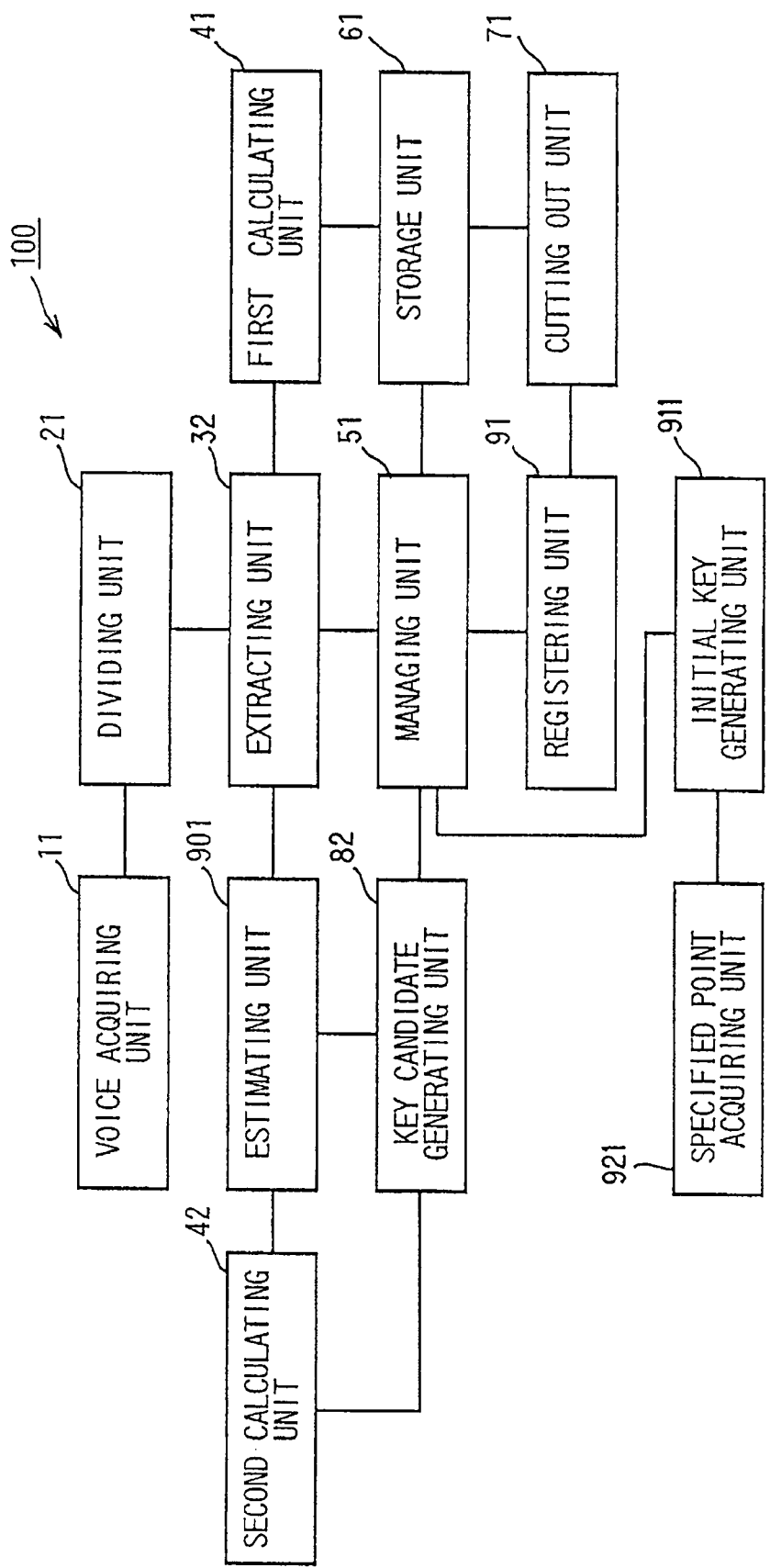
FIG. 11 is a block diagram showing the video editing apparatus according to an embodiment 3.

Referring now to FIG. 11, the video editing apparatus 100 in Embodiment 3 of the present invention will be described.

FIG. 11 is a schematic configuration drawing of the video editing apparatus 100 according to Embodiment 3 of the present invention.

As shown in FIG. 11, the video editing apparatus 100 includes the voice acquiring unit 11, the dividing unit 21, the extracting unit 32, the first calculating unit 41, the managing unit 51, the storage unit 61, the cutting out unit 71, the key candidate generating unit 82, the registering unit 91, the estimating unit 901, an initial key generating unit 911, and a specified point acquiring unit 921.

The present embodiment has a configuration including the initial key generating unit 911 and the specified point acquiring unit 921 added to the configuration in Embodiment 2. The present embodiment is different from Embodiment 2 in that the similar segment including a specified point is searched from a time instance specified by the user as a starting point.

Since those denoted by the same reference numerals as the configuration in Embodiment 2 perform the same actions, description thereof is omitted.

The specified point acquiring unit 921 acquires an arbitrary point included in a focused segment from the sound signals to be analyzed by the operation of the user. As the operation performed by the user, for example, the operation using a device such as a mouse or a remote controller is contemplated. However, other methods may also be employed. For example, a method of reproducing a sound via an apparatus such as a speaker and causing the user to specify a specified point while confirming the sound data is also applicable. Also, a method of presenting a video thumbnail cut out from a video signal synchronous with the sound data to the user and entering the time instant corresponding to the selected video thumbnail as the specified point is also applicable.

The specified point acquiring unit 921 outputs the detected specified point to the initial key generating unit 911 as information which allows access to the sound signal such as the time instance.

Upon receipt of the specified point from the specified point acquiring unit 921, the initial key generating unit 911 acquires the feature vector corresponding to the block including the specified point from the extracting unit 32, generates this feature vector as an initially key, and outputs the same to the managing unit 51.

The managing unit 51 registers this initial key as the search key.

It is also possible to limit the range of search by setting the specified point as an analysis starting point of the cutting out unit 71 or the key candidate generating unit 82 and cutting out only the segment including the analysis starting point.

According to the present embodiment, one scene can be cut out by generating an initial key at the specified point specified by the user and generating plural search keys with the initial key as the analysis starting point.

Therefore, only the segment which is focused by the user can be searched interactively, so that the time and care required for the editing can be reduced.

Also, according to the present embodiment, by cutting out only the scene including the focused time instance of the specified point, applications such as figuring out the entire part only with the thumbnail corresponding only to the specified point, or reproducing sound/video corresponding only to the case where confirmation of detail is wanted are also possible.

Modifications

The present invention is not limited to the embodiments shown above as is, and components may be modified and embodied without departing from the scope of the invention in the stage of implementation. Various modes of the invention are achieved by combining plural the components disclosed in the embodiments described above as needed. For example, the several components may be eliminated from all the components shown in the embodiments. In addition, the components in different embodiments may be combined as needed.

For example, the feature vector used for calculating the degree of similarity for reducing the amount of calculation is commonly used for estimating the sound source in Embodiment 2 described above. Alternatively, another feature vector may be used for enhancing the capability of estimation of the sound source.

The invention claimed is:

1. A video editing apparatus comprising:
a dividing unit configured to divide a sound signal included in video data into a plurality of blocks along a time axis;
an extracting unit configured to analyze the sound signal and extract a feature vector in each of the blocks;
a managing unit configured to manage at least the one feature vector as a search key;
a first calculating unit configured to match the feature vector extracted by the extracting unit to the search key managed by the managing unit respectively in each of the blocks and calculate a first degree of similarity between the search key and the feature vector;
a key candidate generating unit configured to acquire the feature vector the first degree of similarity of which is small from the extracting unit and generate a key candidate;
a second calculating unit configured to match the feature vector extracted by the extracting unit to the key candidate respectively in each of the blocks and calculate a second degree of similarity between the key candidate and the feature vector;
a storage unit configured to store the first degree of similarity and the second degree of similarity in each of the blocks;
a registering unit configured to calculate a co-occurrence score from the first degree of similarity and the second degree of similarity, determine whether or not the key candidate is to be registered as the search key on the basis of the co-occurrence score and additionally register the key candidate determined to be registered to the managing unit as the search key; and
a cutting out unit configured to obtain an integration score in each of the blocks from the degree of similarity of the search key managed by the managing unit in each of the blocks, and cut out a video corresponding to the block having the integration score exceeding an integration threshold value as one segment;
the registering unit setting the co-occurrence score so that a value of the co-occurrence score at a time both of the first and second degrees of similarity exceed a similarity threshold value is higher than a value of the co-occurrence score at a time either of the first and second degrees of similarity does not exceed the similarity threshold value;
the cutting out unit setting a maximum among a group of the degrees of similarity of the blocks, as the integration score.

2. The video editing apparatus according to claim 1, wherein the registering unit registers the key candidate as the search key when the co-occurrence score exceeds a co-occurrence threshold value.

3. The video editing apparatus according to claim 1, further comprising:
an estimating unit configured to match the sound signal of the each block with a dictionary corresponding to a predetermined sound source and estimate a sound source included in the sound signal in each of the blocks,
wherein the key candidate generating unit compares the sound source of the adjacent block, acquires the feature vector of the block including the sound source different from the adjacent block from the extracting unit, and generates the key candidate from the feature vector.

4. The video editing apparatus according to claim 3, further comprising:
a specified point acquiring unit configured to acquire the position of an arbitrary time instance of the sound signal as a specified point by the operation from the user; and
an initial key generating unit configured to extract the feature vector corresponding to the block including the specified point by the extracting unit and generate the feature vector as an initial key,
wherein the managing unit registers the initial key as the search key.

* * * * *